United States Patent [19]
Whitehead

[11] Patent Number: 6,035,201
[45] Date of Patent: Mar. 7, 2000

[54] RADIO TELEPHONE CHANNEL SELECTION

[75] Inventor: Michael Whitehead, Surrey, United Kingdom

[73] Assignee: Nokia Mobile Phones, Limited, Salo, Finland

[21] Appl. No.: 08/782,423

[22] Filed: Jan. 14, 1997

[30] Foreign Application Priority Data

Jan. 19, 1996 [GB] United Kingdom .................... 9601148

[51] Int. Cl.⁷ ...................................................... H04Q 7/32
[52] U.S. Cl. ............................................................ 455/455
[58] Field of Search ................................... 455/455, 574, 455/69, 553, 434, 448

[56] References Cited

U.S. PATENT DOCUMENTS

| | | |
|---|---|---|
| 4,799,253 | 1/1989 | Stern et al. . |
| 5,159,593 | 10/1992 | D'Amico et al. ....................... 370/95.3 |
| 5,396,647 | 3/1995 | Thompson et al. ..................... 455/33.2 |

FOREIGN PATENT DOCUMENTS

| | | |
|---|---|---|
| 2 249 926 | 5/1992 | United Kingdom . |
| 2 266 030 | 10/1993 | United Kingdom . |

*Primary Examiner*—William Cumming
*Attorney, Agent, or Firm*—Perman & Green, LLP

[57] ABSTRACT

A portable handset (7) in a radio cellular telephone system undergoes a channel scan routine to establish the identity of a base station (8a, 8b, 8c) producing the strongest valid signal at the handset. The routine (FIG. 3) involves detecting the signal strengths of all channels, ranking the channels in order of decreasing signal strengths and then checking the validity of each channel in the ranking order. This is likely to be quicker and to require less storage space than the conventional routine which involves saving channel number, signal strengths and validity of all channels, storing these details in a channel table and then selecting a valid channel with the strongest signal.

11 Claims, 3 Drawing Sheets

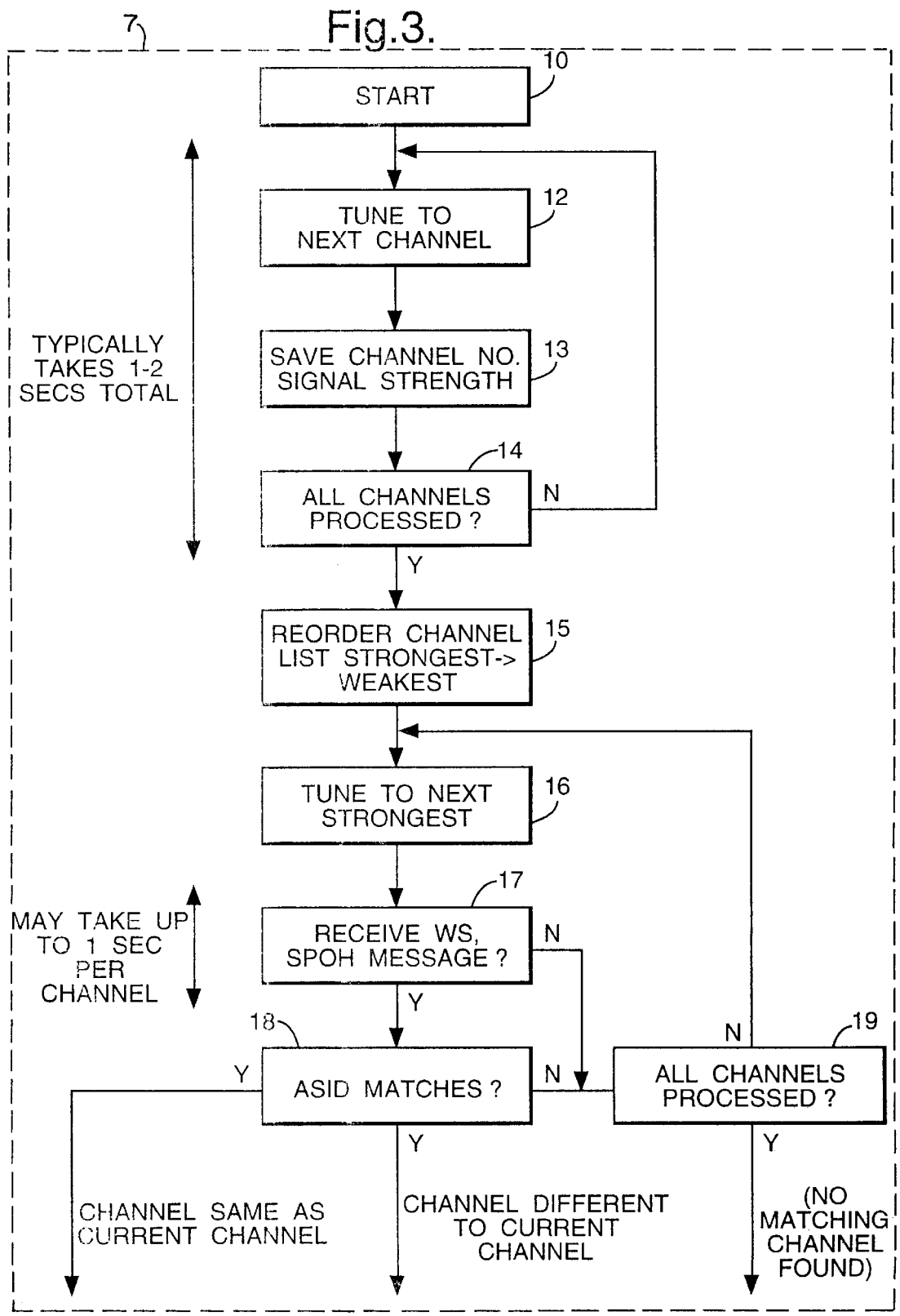

6,035,201

RADIO TELEPHONE CHANNEL SELECTION

FIELD OF INVENTION

This invention relates to channel selection in a radio telephone system.

BACKGROUND TO INVENTION

An example of such a system is a cellular system employing a number of base stations (each serving a geographical area or "cell") with which mobile radios in the form of portable handsets can communicate by means of a radio link. Each base station emits a radio signal on a characteristic channel. When it is required to establish a radio link between a base station and a portable handset the handset undergoes a channel selection procedure with the object of identifying the particular base station producing the strongest valid signal at the handset, normally the nearest base station. The invention is concerned with this channel selection procedure which, when successfully completed, is followed by the establishment of a voice link between the portable handset and the selected base station.

In known cellular radio telephone systems, channel selection follows a procedure governed by an algorithm which results in the execution of the series of steps shown in FIG. 1 of the accompanying drawings. After initiation (step 1) the procedure requires that the portable handset tunes to each of the possible channels in turn (step 2). The handset checks the validity of each channel (step 3) by determining if particular data sequences are received. These particular messages are called the word sync (ws) message and the system parameter overhead message (spoh) which contains an auxiliary system identifier (ASID) number. If both signals are received, the channel number, signal strength and ASID number are stored (step 4) in a channel table. When all channels have been treated in this way (step 5), the channel having the strongest signal with a matching ASID number is selected (step 6). As the system parameter overhead messages transmitted by the base stations are normally sent once per second, it may take up to one second to process each channel and therefore completion of the whole procedure can take several seconds. Because the known method includes storage of data of all channels, there is a requirement for considerable memory for storage of channel numbers, ASID values and signal strengths. The invention aims to provide a channel selection means and method which are quicker than the conventional method and more economical in storage requirements.

SUMMARY OF INVENTION

According to one aspect of the invention there is provided a method of channel selection in a radio telephone, comprising the steps of detecting the signal strength of each available channel out of a plurality of available channels, ranking the channels in order of decreasing signal strengths, checking the validation of each channel in a channel order corresponding to the ranking of the channels and selecting the first channel found to be valid.

According to another aspect of the invention there is provided a radio telephone having channel selection means comprising means for detecting the signal strength of each channel, means for ranking the channels in order of decreasing signal strengths, and means for checking the validation of each channel in a channel order corresponding to the ranking of the channels, so that the first channel found to be valid is selected.

The radio telephone is preferably a mobile station, for example a portable handset or a vehicle-mounted telephone.

BRIEF DESCRIPTION OF THE DRAWINGS

FIG. 3 is a logic flow diagram setting out the steps of the inventive method.

DESCRIPTION OF AN EMBODIMENT OF THE INVENTION

Figure 2:
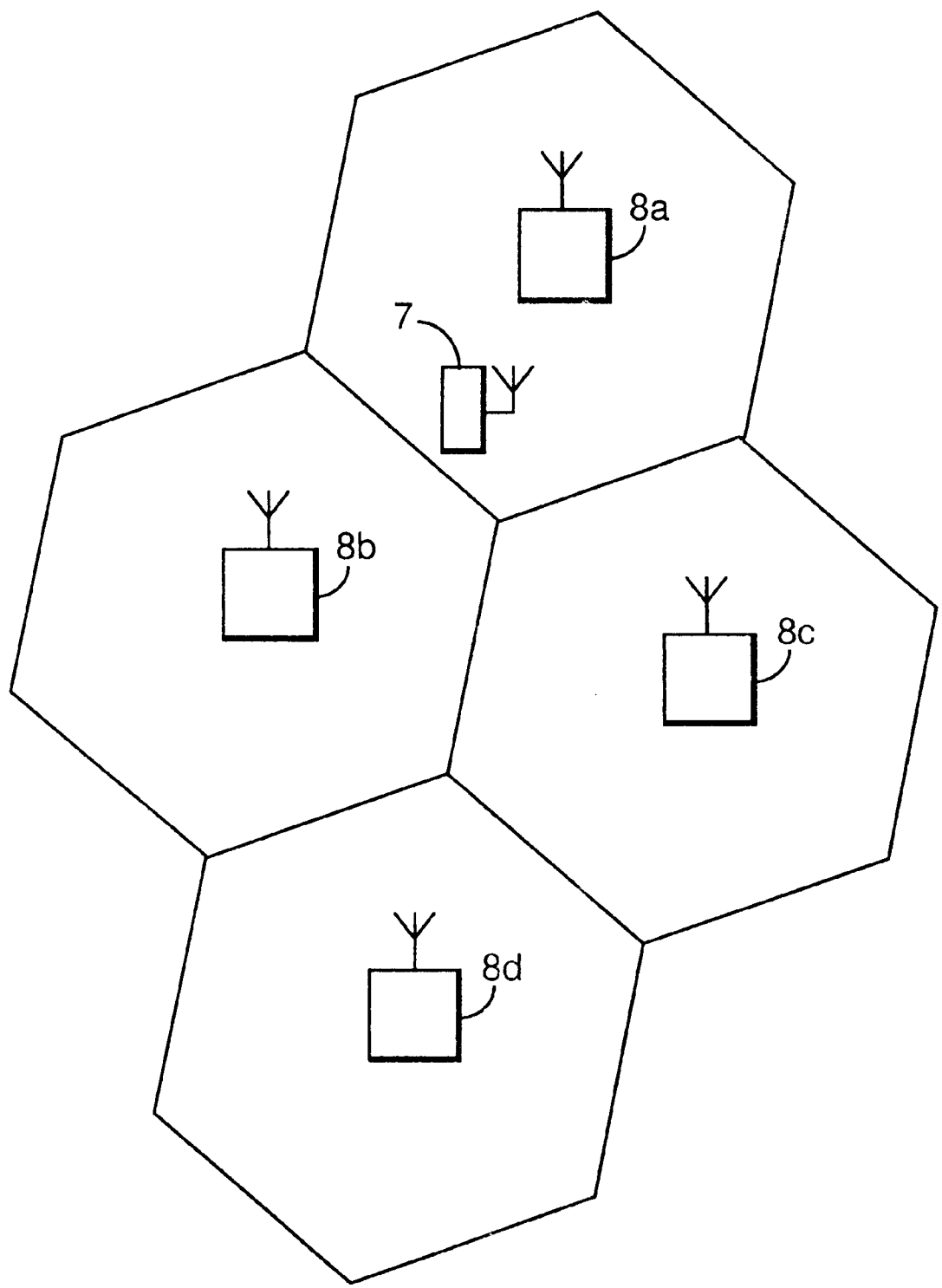
FIG. 2 is a diagram showing a cellular radio telephone system including a radio telephone according to the invention.

The invention will now be further described, by way of example, with reference to FIG. 2 and 3 of the accompanying drawings.

Referring to FIG. 2, a radio telephone 7 in the form of a portable handset is capable of establishing radio communication with base stations 8a, 8b, 8c etc serving geographical areas or cells. The base stations transmit characteristic signals or messages on different channels. When it is required to establish a radio link between the handset and one of the base stations for the purpose of making a call to or from the portable handset, the handset undergoes a channel selection procedure (FIG. 3) to establish which of the base stations should be chosen.

Referring to FIG. 3, after initiation (step 10) the handset tunes to each channel in turn (step 12) and determines the signal strength for each channel. The channel number and signal strength of successive channels are stored (step 13) until all channels have been processed (step 14). The channels are then ranked (step 15) in order of decreasing signal strengths, ie the channel having the strongest signal strength being placed in first position in the ranking order and the channel having with the lowest signal strength being placed in the last position in the ranking order.

Figure 1:
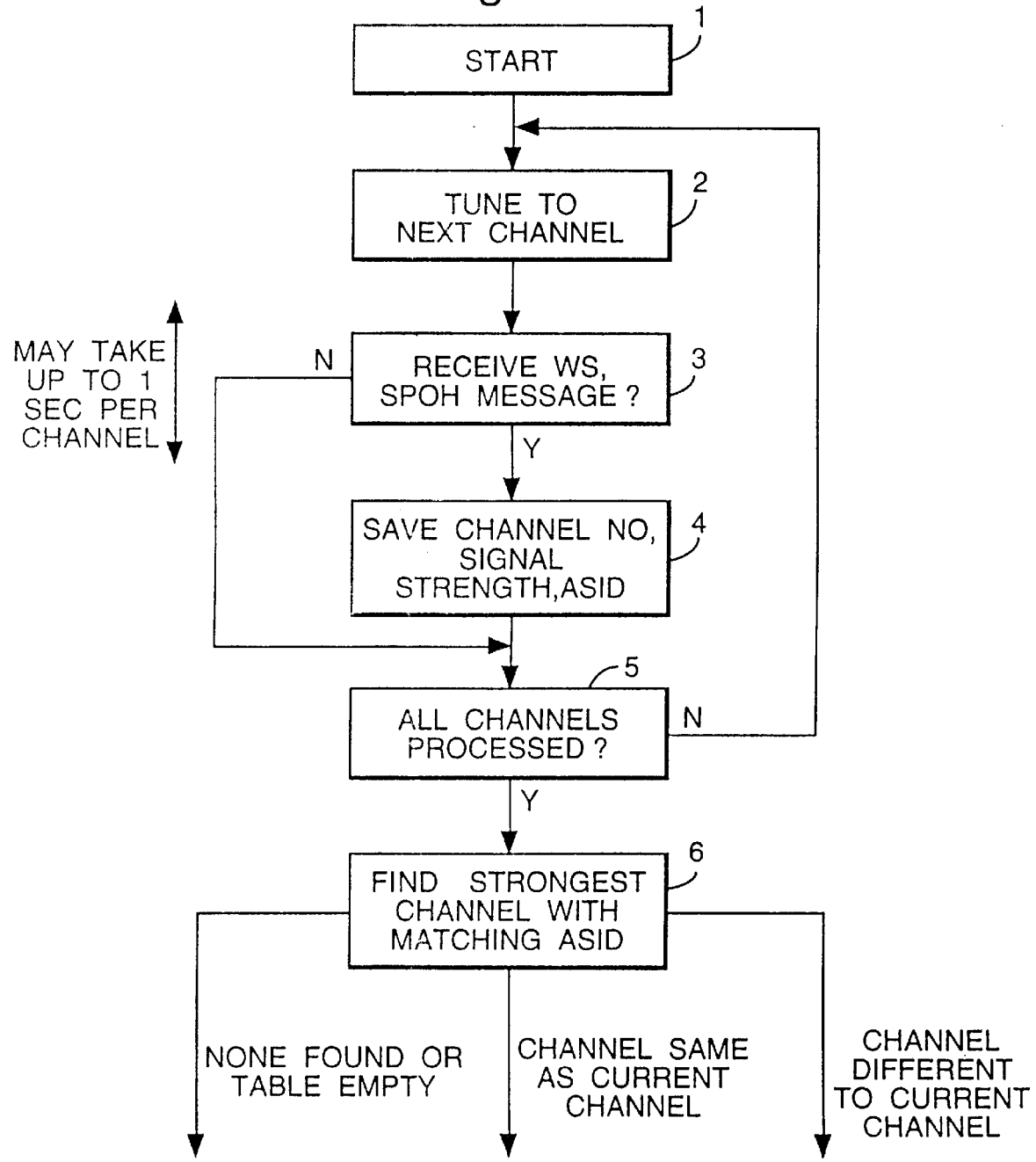
FIG. 1 is a diagram showing a flow chart for governing channel selection in a known cellular radiotelephone system.

Having established this order of channels, the channels are then validated in this order, until a valid channel is found. That is to say, the handset tunes to the channels (step 16) in a channel order corresponding to the ranking order. Starting with the first rank ed channel (ie the channel having the strongest signal ), the handset determines if the word sync (ws) message and the system parameter overhead message (spoh) can be received (step 17). If so, the handset checks (step 18) if the auxiliary system identifier (ASID) number in the spoh matches the prestored number in the handset, this prestored number being representative of the current channel. If the result of the determination made in step 17 or 18 is negative, the handset tunes to the next channel in the ranking order and this channel scanning process continues until a valid channel is found and selected by the handset, or all channels have been processed (step 19). If no valid channel is found, appropriate action is taken. Normally, a valid channel will be found amongst the channels having the strongest signals so this process is likely to take less time than the conventional method illustrated with reference to FIG. 1.

The algorithm which causes the handset to execute the sequence of steps illustrated in the logic diagram of FIG. 3 is implemented in software or firmware incorporated in the handset, this algorithm being factory set and not capable of interference or variation by a handset user.

Thus, the algorithm causes the handset to tune quickly to each of the candidate channels in turn, recording only the signal strength of each channel. This initial scan will typically be very quick (around 1 second in total). The handset then tunes to each of the channels in signal strength order and attempts to receive the word sync and system parameter overhead message. If both conditions are satisfied, the handset then compares the received ASID value with that of the current channel. If the ASID value matches the ASID value for the current channel, then this channel is selected immediately, there being no need to process weaker channels, and the appropriate action is taken.

Advantages of the described method are:

in most typical situations, one of the strongest channels of the candidate set will have valid data and match the current ASID value, and therefore the time to execute the task will be greatly reduced. At worst, the time taken will be no longer than if the task is implemented according to the conventional routine of FIG. 1.

because the ASID value of each channel does not need to be recorded in the channel table, the memory requirements for the handset are reduced.

What I claim is:

1. A method of channel selection in a radio telephone for selecting a valid channel with the strongest signal from among a Plurality of available channels, comprising the steps of:

first, detecting the signal strengths of each available channel of said plurality of available channels, next, ranking the channels in order of decreasing signal strengths, then, checking the validation of each channel in a channel order corresponding to the ranking of the channels, and selecting the first channel found to be valid wherein validation comprises the steps of:

beginning with the channel detected to have the strongest signal in the ranking order, determining if the telephone has received predetermined validating data for that channel, and if it has not, repeating the validation with the next channel in the ranking order until a channel is found for which said predetermined validating data has been received and selecting that channel, whereby the valid channel with the strongest signal is selected from among said plurality of available channels.

2. A method according to claim 1, wherein the ranking of the channels in accordance with signal strength is stored until all the channels have been checked and stored.

3. A method according to claim 1, wherein said predetermined validating data comprises a word synch message and a system parameter overhead message.

4. A method according to claim 3 wherein said system parameter overhead message comprises an auxiliary system identifier (ASID) number and further comprising the steps of:

prestoring identifier numbers corresponding to the channels;

when it is determined that the telephone has received predetermined validating data including a word sync message and a system parameter overhead message, comparing the ASID number with the prestored identifier number corresponding to the present channel being checked; and if the comparison is negative, repeating the validation with the next channel in the ranking order until a positive comparison is found.

5. A radio telephone having channel selection means for selecting a valid channel with the strongest signal from among a plurality of available channels, comprising:

means for detecting the signal strengths of each available channel of a plurality of available channels, means, responsive to said detecting means, for ranking the channels in order of decreasing signal strengths, means, responsive to said ranking means, for checking the validation of each channel in a channel order corresponding to the ranking of the channels, and comprising:

means for determining, beginning with the channel detected to have the strongest signal in the ranking order, if the telephone has received predetermined validating data for that channel, and means, responsive to a determination by said determining means that predetermined validating data has not been received for a channel, for repeating the validation with the next channel in the ranking order until a channel is found for which said predetermined validating data has been received, and means for selecting the first channel found in the ranking order for which said predetermined validating data has been received, whereby the valid channel with the strongest signal is selected from among said plurality of available channels.

6. A radio telephone according to claim 5, wherein the radio telephone is a portable handset in the cellular radio telephone system.

7. A radio telephone according to claim 5 further comprising means for storing the ranking of the channels in accordance with signal strength until all of the channels have been checked and stored.

8. A radio telephone having channel selection means comprising:

means for detecting the signal strengths of each available channel of a plurality of available channels, means for ranking the channels in order of decreasing signal strengths, means for checking the validation of each channel in a channel order corresponding to the ranking of the channels, and means for selecting the first channel found to be valid comprising:

means for determining if the telephone has received predetermined data, including a word sync message and a system parameter overhead message comprising an auxiliary system identifier (ASID) number, and if it has not, for repeating the validation with the next channel in the ranking order until a channel is found that has;

means for prestoring identifier numbers corresponding to the channels;

means for comparing, when it is determined that the telephone has received predetermined data including a word sync message and a system parameter overhead message, the ASID number with the prestored identifier number corresponding to the present channel being checked; and means for repeating the validation with the next channel in the ranking order if the comparison is negative until a positive comparison is found.

9. A method of channel selection in a radio telephone, comprising the steps of:

detecting the signal strengths of each available channel of a plurality of available channels, ranking the channels in order of decreasing signal strengths, checking the validation of each channel in a channel order corresponding to the ranking of the channels, and selecting the first channel found to be valid wherein validation comprises the steps of:
- determining if the telephone has received predetermined data including a word sync message and a system parameter overhead message comprising an auxiliary system identifier (ASID) number,
- if it has not, repeating the validation with the next channel in the ranking order until a channel is found that has, and
- prestoring identifier numbers corresponding to the channels;
- when it is determined that the telephone has received predetermined data including a word sync message and a system parameter overhead message, comparing the ASID number with the prestored identifier number corresponding to the present channel being checked; and
- if the comparison is negative, repeating the validation with the next channel in the ranking order until a positive comparison is found.

10. A radio telephone according to claim 5, wherein said predetermined validating data comprises a word synch message and a system parameter overhead message.

11. A radio telephone according to claim 10 wherein said system parameter overhead message comprises an auxiliary system identifier (ASID) number and further comprising the steps of:
- means for prestoring identifier numbers corresponding to the channels;
- means for comparing, when it is determined that the telephone has received predetermined validating data including a word sync message and a system parameter overhead message, the ASID number with the prestored identifier number corresponding to the present channel being checked; and
- means for repeating the validation with the next channel in the ranking order if the comparison is negative until a positive comparison is found.

* * * * *